United States Patent [19]

Ando

[11] Patent Number: 5,579,412
[45] Date of Patent: Nov. 26, 1996

[54] IMAGE PROCESSING APPARATUS

[75] Inventor: Tsutomu Ando, Zama, Japan

[73] Assignee: Canon Kabushiki Kaisha, Tokyo, Japan

[21] Appl. No.: 443,387

[22] Filed: May 17, 1995

Related U.S. Application Data

[63] Continuation of Ser. No. 148,342, Nov. 8, 1993, abandoned.

[30] Foreign Application Priority Data

Nov. 13, 1992 [JP] Japan ................................. 4-303861

[51] Int. Cl.$^6$ ........................... G06K 9/36; G06K 9/46
[52] U.S. Cl. ................................ 382/240; 382/299
[58] Field of Search .................................... 382/232, 233, 382/240, 298, 299, 300, 301, 302, 303, 304; 358/261.2, 262.1, 444, 445, 451

[56] References Cited

U.S. PATENT DOCUMENTS

| | | | |
|---|---|---|---|
| 4,742,558 | 5/1988 | Ishibashi et al. | 382/56 |
| 4,903,317 | 2/1990 | Nishihara et al. | 382/56 |
| 5,231,679 | 7/1993 | Matsuura et al. | 382/232 |

FOREIGN PATENT DOCUMENTS

| | | |
|---|---|---|
| 0357388 | 3/1990 | European Pat. Off. . |
| 0376679 | 7/1990 | European Pat. Off. . |

OTHER PUBLICATIONS

Signal Processing Image Communication, vol. 4, No. 2, Apr. 1992, pp. 103–111, Hampel et al., "Technical features of the JBIG standard for progressive bi–level image compression."

*Primary Examiner*—Leo Boudreau
*Assistant Examiner*—Phuoc Tran
*Attorney, Agent, or Firm*—Fitzpatrick, Cella, Harper & Scinto

[57] ABSTRACT

In an image processing apparatus, image data having a first resolution read from a first image memory is encoded by an arithmetic encoder and is converted into image data having a second resolution by an image reduction unit, and the image data having the second resolution is stored in a second image memory. Thereafter, the image data having the second resolution read from the second image memory is encoded by the arithmetic encoder and is converted by the image reduction unit into image data having a third resolution, and is stored in the first image memory in which the image data having the first resolution has been stored.

11 Claims, 9 Drawing Sheets

IMAGE PROCESSING APPARATUS

This application is a continuation, of application Ser. No. 08/148,342 filed Nov. 8,1993, now abandoned.

BACKGROUND OF THE INVENTION

FIELD OF THE INVENTION

This invention relates to an image processing apparatus which may be utilized in a facsimile apparatus, an electronic filing apparatus or the like, and more particularly, to an image processing apparatus which performs image encoding and decoding according to hierarchical encoding.

In a facsimile apparatus which is a typical conventional static image communication apparatus, a system is adopted in which images are sequentially scanned in a raster direction, encoded and transmitted. Since every pixel of the image must be encoded and transmitted in order to send the entire image, transmission takes a long time, and therefore, the application of the system to image communication services, such as an image database service, videotex or the like, is difficult.

Figure 9:
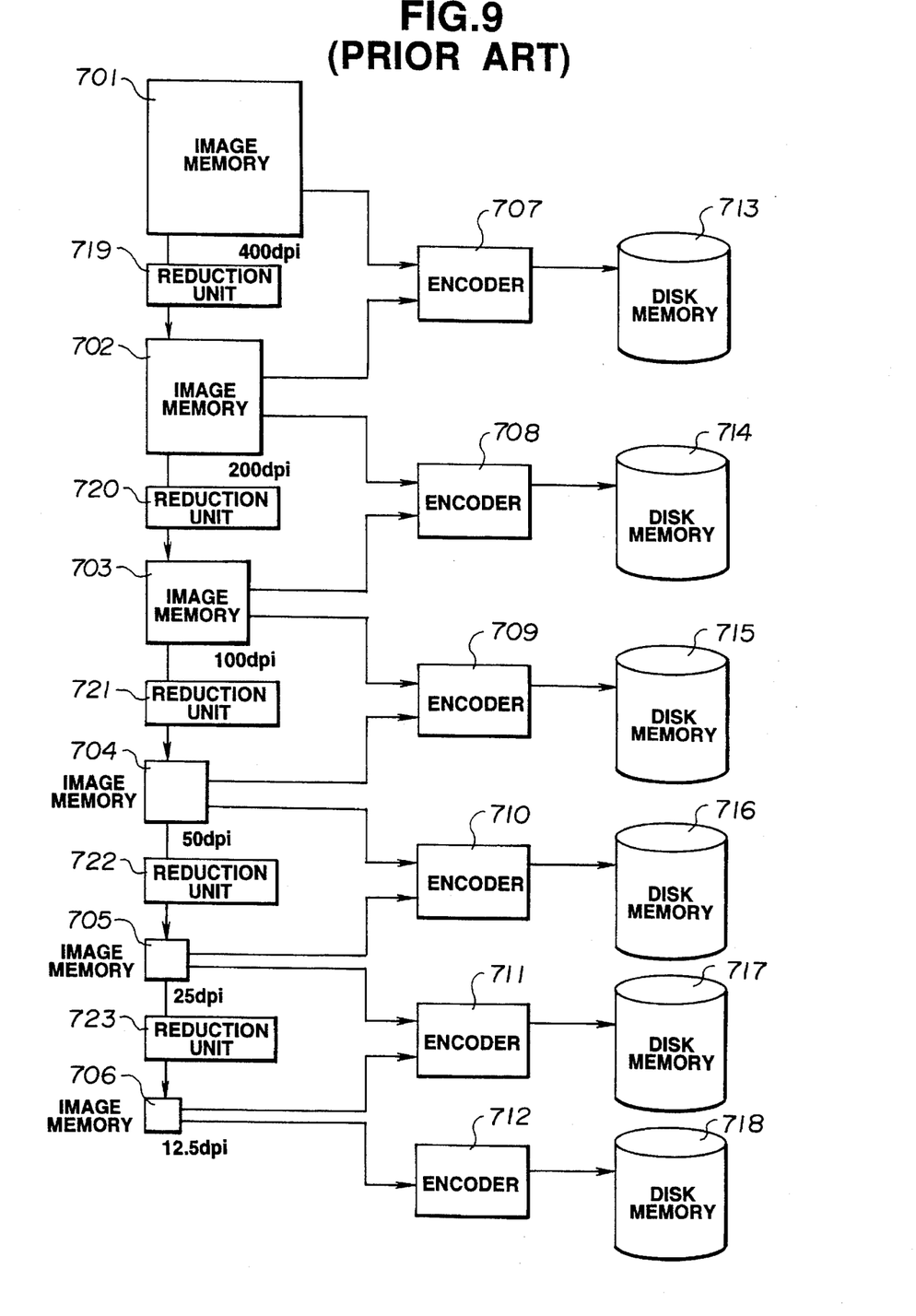
FIG. 9 is a block diagram showing the configuration of a conventional apparatus.

In order to transmit an overall image quickly, hierarchical encoding has been devised by the JBIG (Joint Bi-level Image Experts Group, which is an organization of the ISO/CCITT (International Organization for Standardization/ Comité Consulatif International Télégraphique et Tél éphonique)). An example of conventional hierarchical encoding is shown in FIG. 9. In this example, an original image to be encoded has a resolution of 400-dpi (dots per inch). In FIG. 9, image memories 701 through 706 are provided for storing 400-, 200-, 100-, 50-, 25- and 12.5-dpi images, respectively. Reduction units 719 through 723 provides 200-, 100-, 50-, 25- and 12.5-dpi images, respectively, and encoders 707 through 712 encode 400-, 200-, 100-, 50-, 25- and 12.5-dpi images, respectively.

The encoded 400-, 200-, 100-, 50-, 25- and 12.5-dpi images are stored in disk memories 713 through 718, respectively.

Reduction unit 719 reduces a 400-dpi image, from image memory 701, by a technique in which the image is subsampled to ½ in both the main-scanning and sub-scanning directions to provide a 200-dpi image, which is stored in image memory 702. The above mentioned subsample process is not a simple subsampling as default, but a specially programmed JBIG standard method. The 200-dpi image is further reduced by reduction unit 720 to provide a 100-dpi image, which is stored in image memory 703. Likewise, 50-, 25- and 12.5-dpi images are provided and are stored in image memories 704, 705 and 706, respectively.

The images, which are stored in disk memories 713 through 718, are transmitted, in turn, in codes beginning with lower resolution images so as to give a rough overall image. Namely, the images are transmitted in the order of 12.5-, 25-, 50-, 100-, 200- and 400-dpi images.

To encode the 12.5-dpi image, the image stored in image memory 706 is scanned and entropy encoding (such as arithmetic encoding) is performed by referring to an object pixel to be encoded and the surrounding pixels. As regards the 25-dpi image, encoding is performed by encoder 711 by referring to pixels surrounding a target pixel from image memory 705, and surrounding pixels of the 12.5-dpi image from image memory 706, so that encoding efficiency is improved.

Likewise, as regards the 50-dpi image of image memory 704, the 25-dpi image of image memory 705 is referred to and encoded by encoder 710; as regards the 100-dpi image of image memory 703, the 50-dpi image of image memory 704 is referred to and encoded by encoder 709; as regards the 200-dpi image of image memory 702, the 100-dpi image of image memory 703 is referred to and encoded by encoder 708; and, as regards the actual-size (400-dpi) image of image memory 701, the 200-dpi image of image memory 702 is referred to and encoded by encoder 707.

In a typical configuration as shown in FIG. 9, however, it is necessary to provide image memories 701 through 706, corresponding to respective resolutions, thereby causing an increase in the production cost. Furthermore, since data for several lines are used as reference pixels for image reduction and encoding for both high-resolution and low-resolution images, interfacing with the image memories becomes complicated.

SUMMARY OF THE INVENTION

The present invention has been made in consideration of the above-described problems.

It is an object of the present invention to provide an image processing apparatus, having a simple configuration, in which the number or the quantity of image memories used in hierarchical encoding and decoding is reduced.

it is another object of the present invention to provide an image processing apparatus with a configuration which is simplified by storing image data of a plurality of resolutions in a common image memory in hierarchical encoding and decoding.

It is still another object of the present invention to provide an image processing apparatus in which hierarchical encoding and decoding can be performed using a couple of image memories by switching the input/output relationship of image memories.

According to one aspect, the present invention achieves these objectives in an image processing apparatus in which image data having a first resolution, read from first storage means, is encoded by encoding means and is converted into image data having a second resolution by conversion means. The image data having the second resolution is stored in second storage means. Thereafter, the image data having the second resolution, read from the second storage means, is encoded by the encoding means and is converted into image data having a third resolution by the conversion means. The image data having the third resolution is also stored in the first storage means in which the image data having the first resolution has been stored.

According to another aspect of the present invention, an image processing apparatus is provided in which encoded data representing an image having a second resolution is decoded by decoding means while referring to image data having a first resolution read from first storage means, and image data which is formed, having the second resolution, is stored in second storage means. Thereafter, encoded data representing an image having a third resolution is decoded by the decoding means while referring to the image data having the second resolution read from the second storage means, and image data which is formed, having the third resolution, is stored in the first storage means in which the image data having the first resolution has also been stored.

These and other objects, advantages and features of the present invention will become more apparent from the following description of the preferred embodiments taken in conjuction with the accompanying drawings.

DESCRIPTION OF THE PREFERRED EMBODIMENTS

First Embodiment

In a first embodiment of the present invention, an original image is assumed to be a 400-dpi image, which is sequentially reduced by ½ to a 12.5-dpi image. Of course, the resolution of the original image and the number of hierarchies are not limited to the above-described values.

Figure 1:
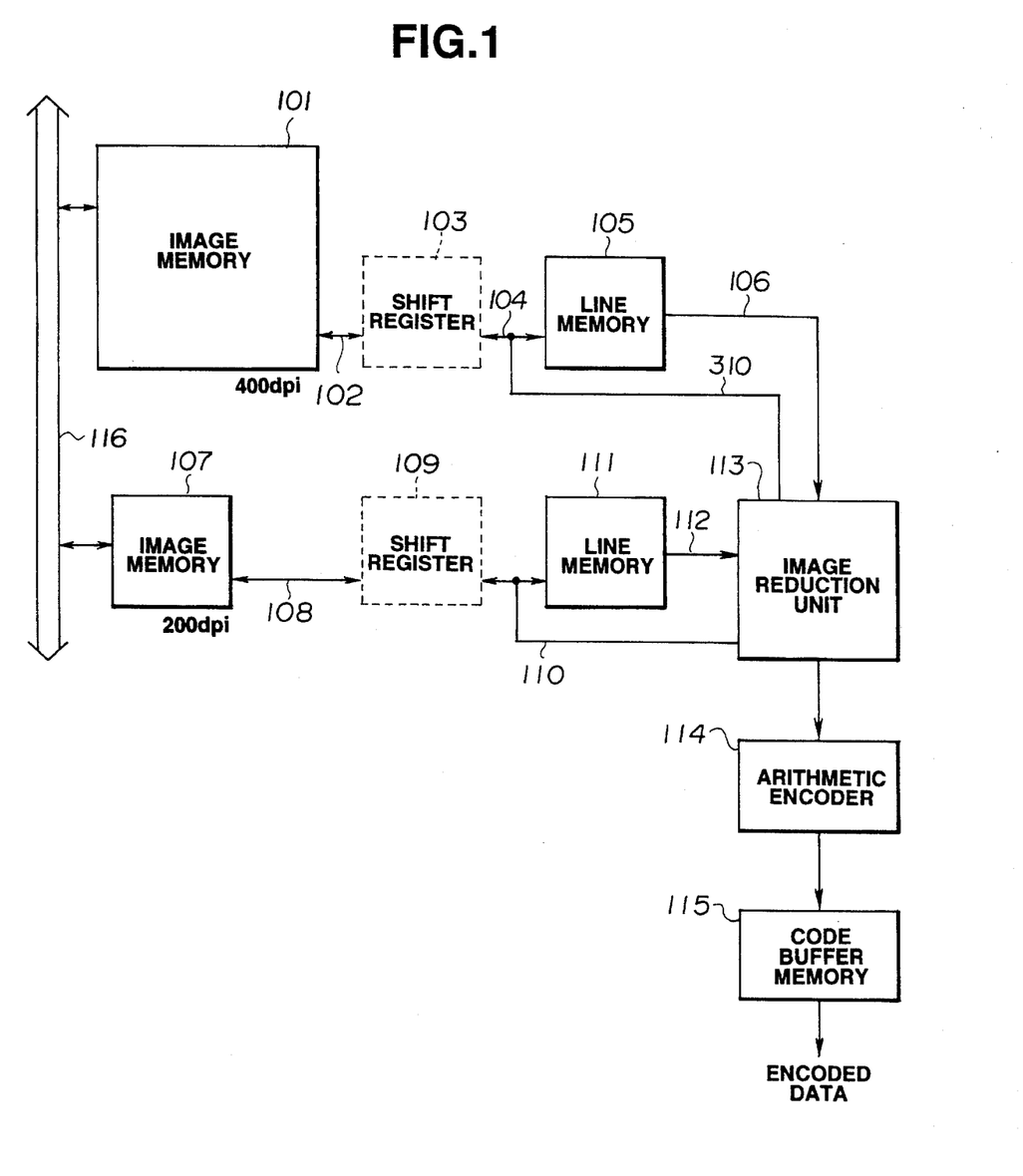
FIG. 1 is a block diagram showing the configuration of an image processing apparatus according to a first embodiment of the present invention.

FIG. 1 illustrates the configuration of an image processing apparatus according to the first embodiment.

In FIG. 1, there are shown image memories 101 and 107, parallel/serial conversion or serial/parallel conversion shift registers 103 and 109, line memories 105 and 111, each comprising a FIFO circuit, image reduction unit 113 for reducing images and for generating reference pixels for arithmetic encoding, arithmetic encoder 114, code buffer memory 115 and data bus 116. Image reduction unit 113 performs image reduction processing as disclosed in U.S. Pat. No. 5,159,468.

Next, the operation in the above-described configuration will be described.

Figure 2:
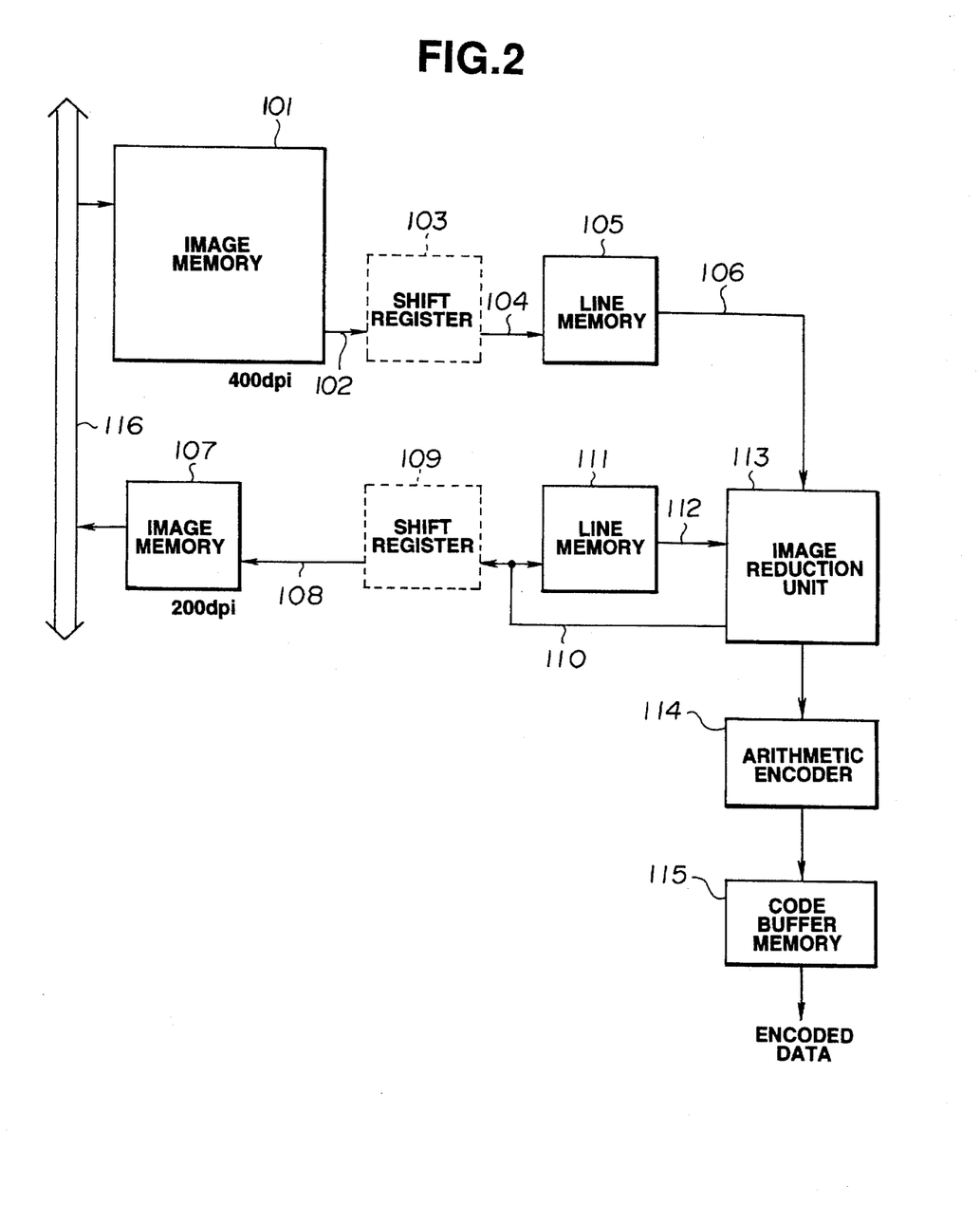
FIG. 2 is a diagram illustrating the flow of signals when a 400-dpi image is converted into a 200-dpi image in the configuration shown in FIG. 1.
Figure 3:
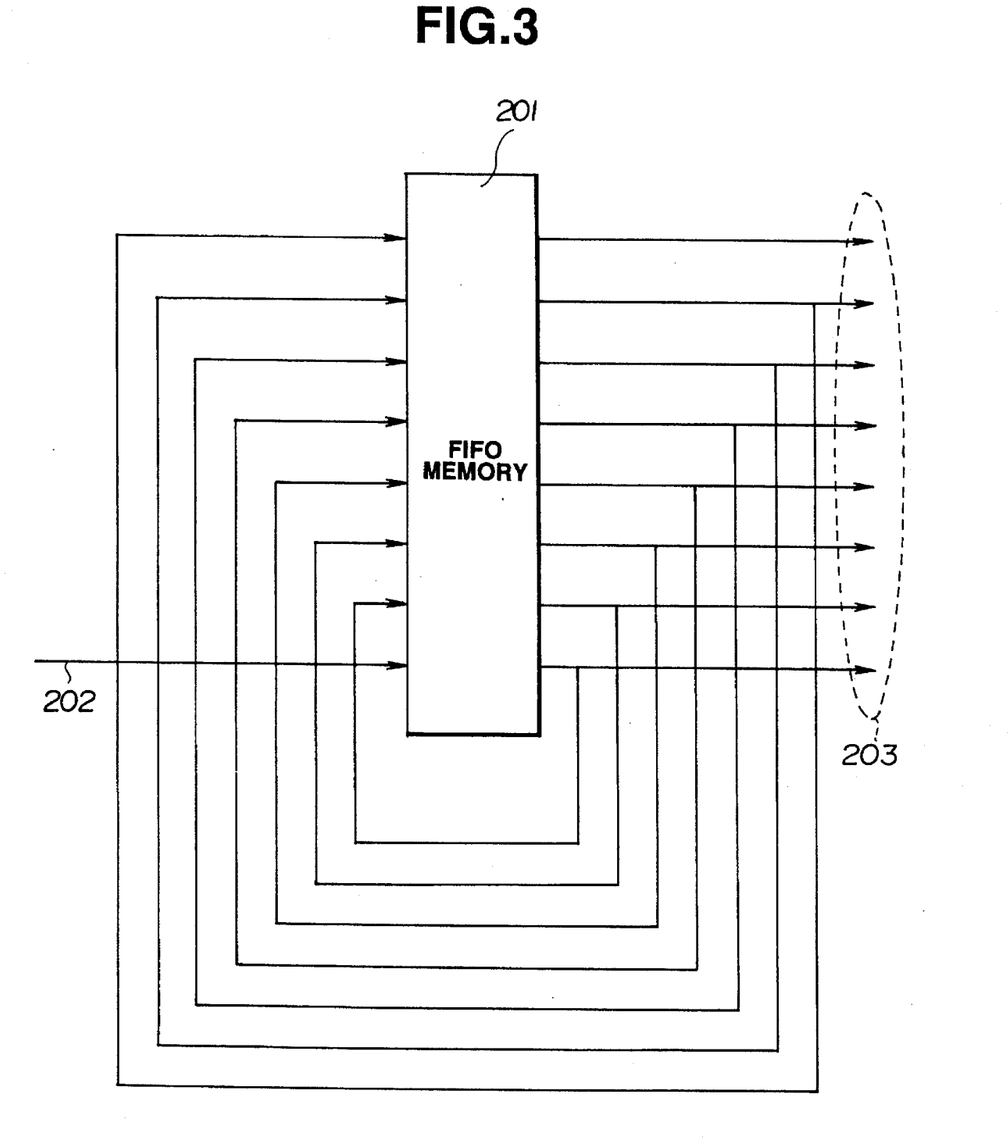
FIG. 3 is a block diagram illustrating a connection method of a FIFO (first-in first-out) circuit in the embodiment shown in FIG. 1.

FIG. 2 illustrates the flow of signals when 400-dpi original-image data is converted into a 200-dpi image, and is encoded. 10 The 400-dpi image data is written in image memory 101, which can store image data (corresponding to a 400-dpi image) for at least one sheet having an original image, via a line, such as data bus 116 or the like. Image memory 107 stores image data of a reduced 200-dpi image. Accordingly, image memory 107 is only required to have a capacity corresponding to ¼ of the capacity of image memory 101. When image data 102, read from the high-resolution image memory 101 in the sequence of raster scanning, is packed as parallel data having a predetermined bit length, it is converted into serial data 104 by shift register 103. When image data 102 is not packed as parallel data, i.e., in the case of serial data, the shift register 103 is unnecessary. Serial data 104 is input to image reduction unit 113 as pixel data 106, for several lines in the sub-scanning direction, via line memory 105 having a delay amount for the several lines. FIG. 3 shows the method of connection of line memory 108. In FIG. 3, FIFO memory 201 can store image data for at least 8 lines. Reference numeral 202 represents input serial image data. Reference numeral 203 represents delayed image data for 8 lines.

In the line memory 105 shown in FIG. 2, serial image data 202 is delayed by 8 lines via FIFO memory 201 shown in FIG. 3, and parallel image data 203 is output. Referring again to FIG. 2, pixel data 110, reduced to a 200-dpi image by image reduction unit 113, is subjected to serial/parallel conversion by shift register 109, and is written in image memory 107 as reduced parallel image data 108. When image memory 107 can receive serial data, shift register 109 is unnecessary.

Image reduction unit 113 supplies arithmetic encoder with image data for several pixels (necessary for encoding) from among 400-dpi image data input from line memory 105 and 200-dpi image data obtained from the 400-dpi image data. Arithmetic encoder 114 performs prediction by making several high-resolution and several low-resolution pixels predictive reference pixels. A target pixel transmitted from image reduction unit 113 is encoded based on the result of the prediction. Encoded data obtained from arithmetic encoder 114 is stored in code buffer memory 115 in a predetermined amount, and is output.

Figure 4:
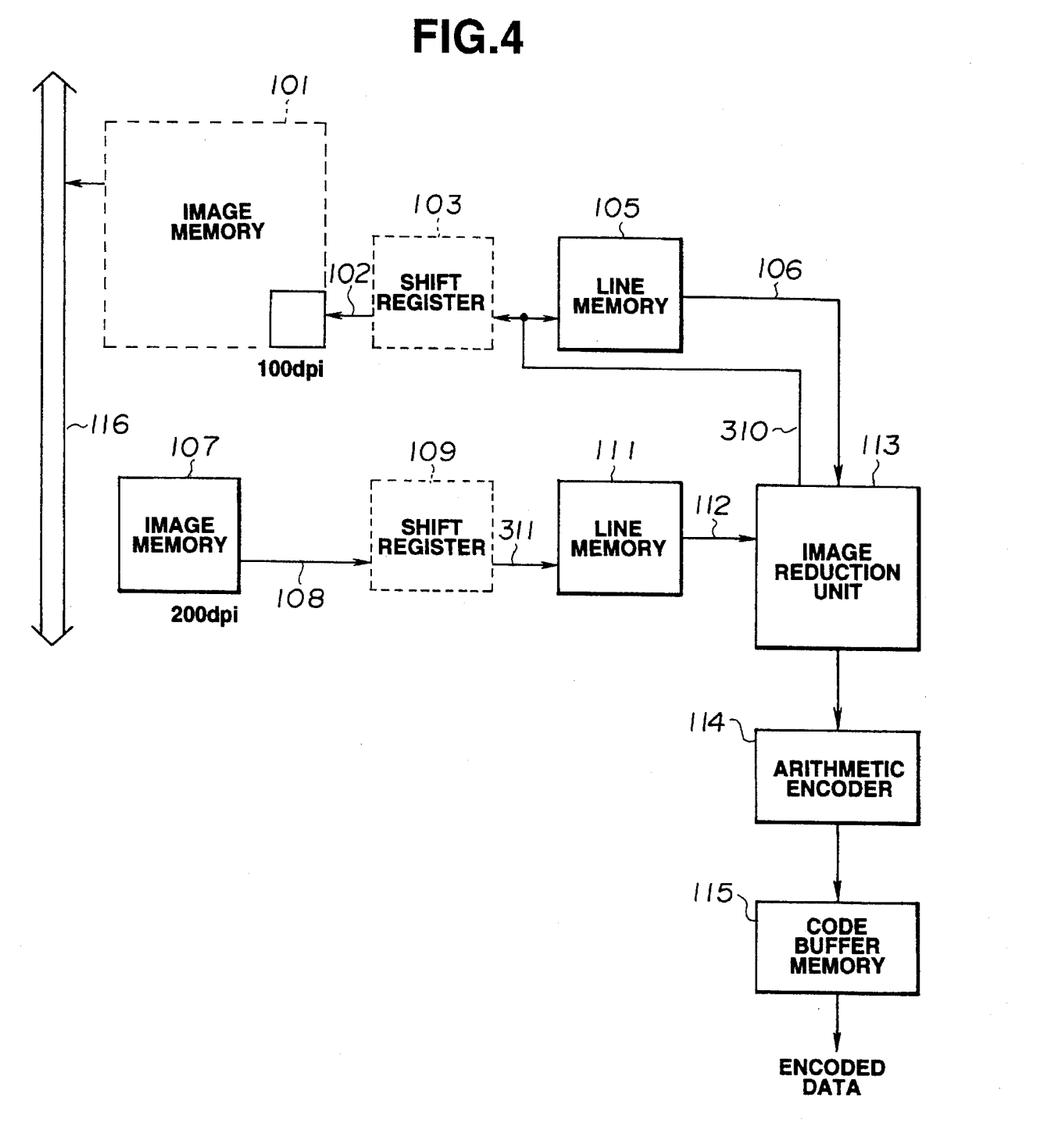
FIG. 4 is a diagram illustrating the flow of signals when a 200-dpi image is converted into a 100-dpi image in the configuration shown in FIG. 1.

FIG. 4 illustrates the flow of signals when a 100-dpi image is generated from the 200-dpi image stored in image memory 107, and is encoded. In FIG. 4, reference numeral 310 represents pixel data reduced by image reduction unit 113.

When 200-dpi image data 108, read from image memory 107 in the sequence of raster scanning, is packed as parallel data having a predetermined bit length, it is converted by shift register 109 into serial data 311. When image data 108 is not packed as parallel data, i.e., in the case of serial 10 data, the shift register is unnecessary. Serial data 311 is input to image reduction unit 113 as pixel data 112, for several lines in the sub-scanning direction, via line memory 111 having a delay amount for the several lines.

Pixel data 310, reduced to a 100-dpi image by image reduction unit 113, is subjected to serial/parallel conversion by shift register 103, and is written in image memory 101 as parallel image data 102. When image memory 101 can receive serial data, shift register 103 is unnecessary.

Image reduction unit 113 supplies arithmetic encoder 114 with image data for several pixels, necessary for encoding, from among 200-dpi image data input from line memory 11 and 100-dpi image data obtained from the 200-dpi image data.

Image memory 101 is an image memory for 400-dpi image data. However, a part of image memory 101 is used as an image memory for 100-dpi image data. The direction of read/write for image memory 101 shown in FIG. 4 is opposite to that of image memory 101 shown in FIG. 2. A 100-dpi reduced image is stored in this image memory 101 in FIG. 4, and the original 400-dpi image data is lost. However, since the 400-dpi image data has been encoded together with the 200-dpi image data and has been stored in code buffer memory 115, or an external memory as encoded data, it can be decoded whenever necessary.

By further changing the flow of data as shown in FIGS. 2 and 4, so that a 50-dpi reduced image and a 25-dpi reduced image, and further a 12.5-dpi reduced image are generated and stored in image memory 107, image memory 101, and again in image memory 107, and encoded, respectively, encoding in six hierarchies can be performed. The 12.5-dpi image data is encoded by itself as the lowest-resolution image data.

As described above, according to the first embodiment, by using two image memories and by switching between them at high and low resolutions, it is unnecessary to provide image memories for the number of hierarchies, thereby reducing the cost of image memories.

On the other hand, in decoding, 12.5-dpi image data is first decoded and stored in image memory 107, followed by the decoding and storage of 25-dpi image data, 50-dpi image data, and 100-dpi image data, in image memories 101, 107, and again in 101, respectively. At that time, if image data of a certain resolution is required for an outputting operation, such as a display operation or the like, the image data may, of course, be sequentially transferred via data bus 116.

Figure 5:
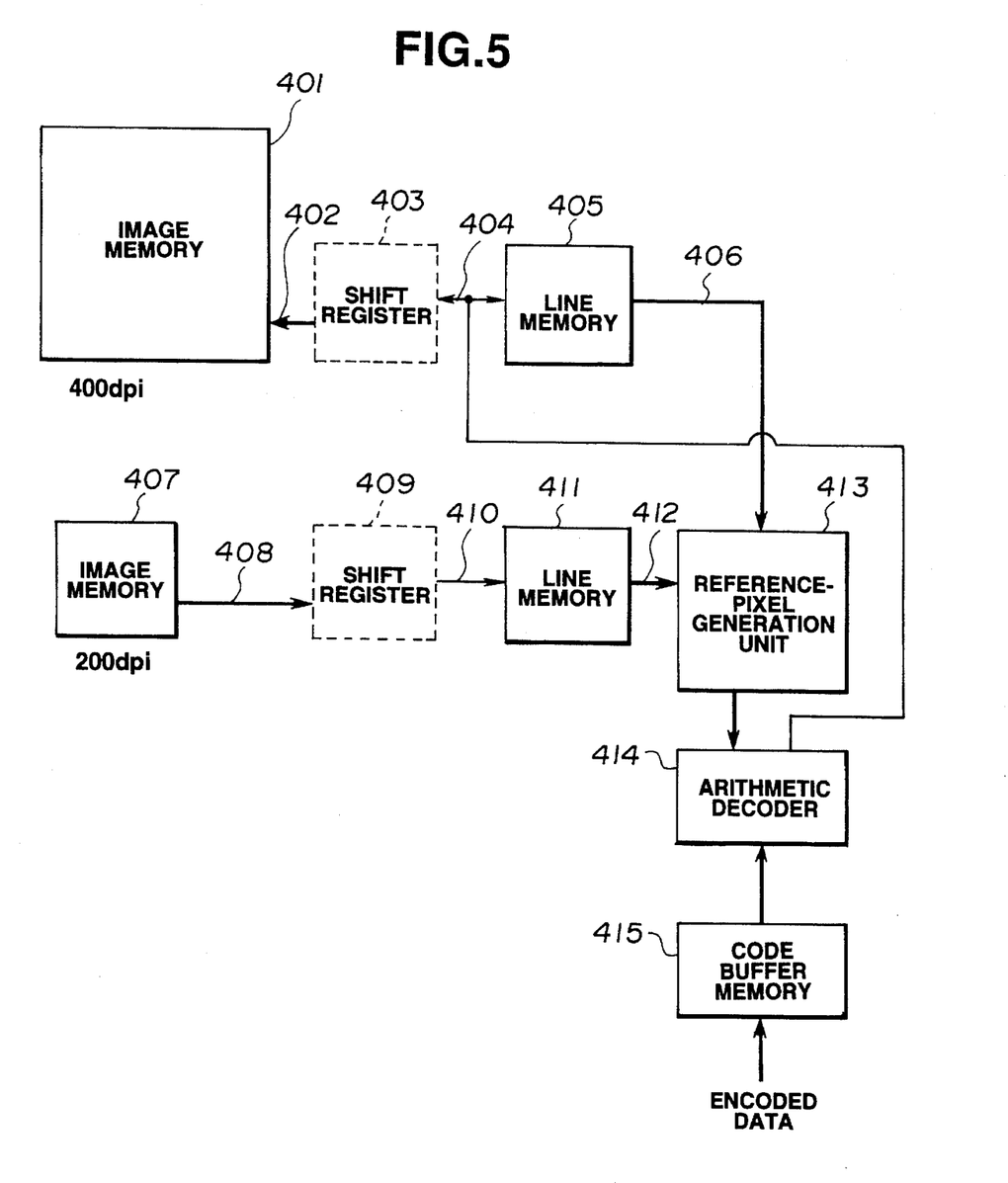
FIG. 5 is a diagram illustrating the flow of signals in a decoding operation in the first embodiment.

FIG. 5 illustrates the configuration of an image processing apparatus used in decoding. In FIG. 5, there are shown: image memory 401 for 400-dpi original-image data, shift registers 403 and 409, line memories 405 and 411, 10 image memory 407 for 200-dpi reduced image data, reference-pixel generation unit 413, arithmetic decoder 414, and code buffer memory 415.

In this embodiment, it is assumed that image data up to 200-dpi have already been decoded and stored in image memory 407. FIG. 5 illustrates the operation when (400-dpi) image data corresponding to the original image is decoded and stored in image memory 401.

Encoded data representing the 400-dpi image, stored in code buffer memory 415, is input to arithmetic decoder 414. Low-resolution (200-dpi) reference pixel data 412, stored in image memory 407, and high-resolution (400-dpi) reference pixel data 406, stored in line memory 405, are input to reference pixel generation unit 413, whose output is input to arithmetic decoder 414. Thus, decoded-pixel data 404 is output from arithmetic decoder 414. The decoded-pixel data 404 is stored in image memory 401, and is input to line memory 405 so as to be used as reference-pixel data for decoding the subsequent encoded data.

Since image reduction processing is unnecessary in decoding, reference pixel generation unit 413 has only the function of generating reference pixels.

As described above, in the present method, the same configuration may be used in both encoding and decoding operations.

Second Embodiment

Figure 6:
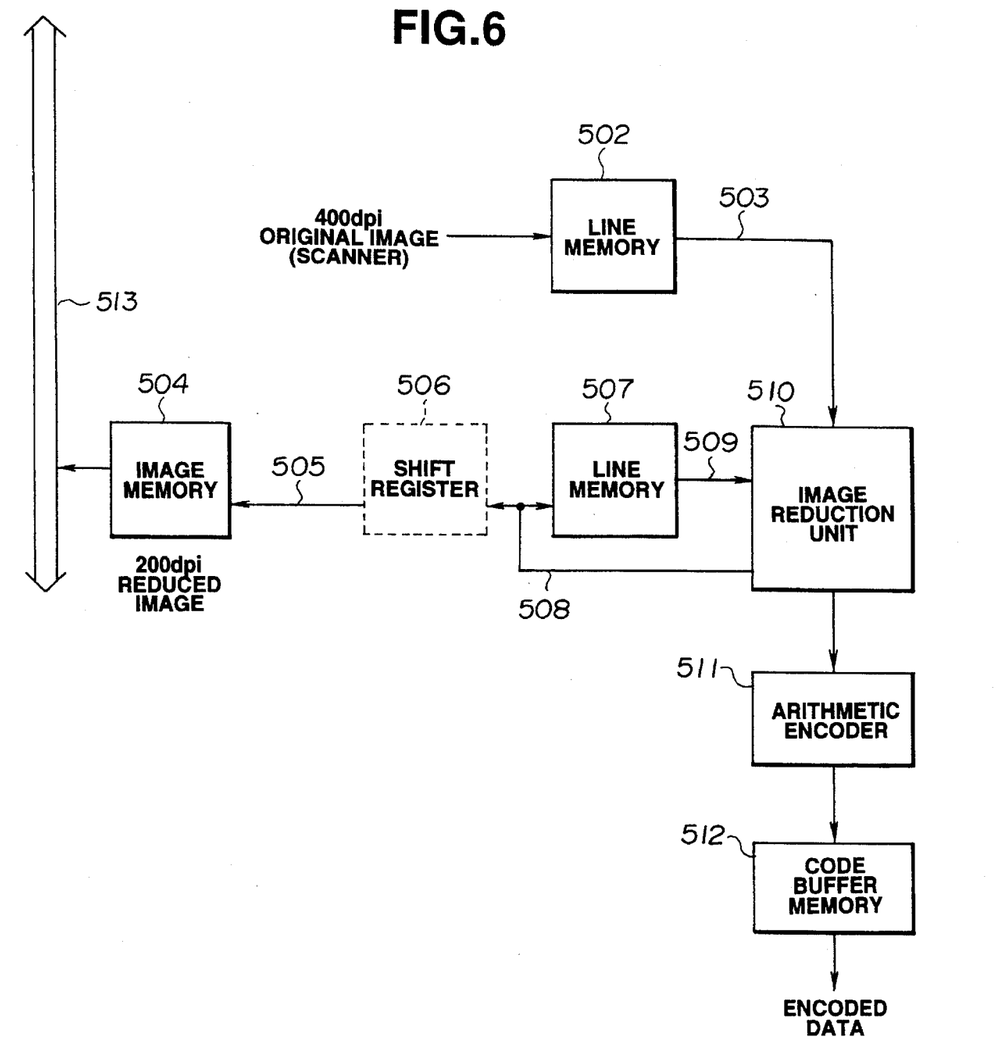
FIG. 6 is a diagram illustrating the flow of signals when a 400-dpi image is converted into a 200-dpi image according to a second embodiment of the present invention.

FIG. 6 illustrates the configuration of an image processing apparatus according to a second embodiment of the present invention. In FIG. 6, there are shown: image memory 504 for 200-dpi reduced image data, shift register 506, line memories 502 and 507, image reduction unit 510, arithmetic encoder 511, code buffer memory 512 and data bus 513. FIG. 6 illustrates the flow of signals when 400-dpi image data, obtained by reading an original image by a scanner (not shown), is converted into 200-dpi image data, and is encoded.

In the second embodiment, an image scanner, which reads an original image line by line using a CCD (charge-coupled device) linear image sensor, is used as a device for inputting the 400-dpi original image. When outputting a decoded image, an output device, such as a laser-beam printer (LBP) or the like, is directly connected.

Next, the operation in the above-described configuration will be described.

The serial data output from the image scanner is directly input to line memory 502, to be delayed by several lines, and is then input to image reduction unit 510. In the same manner as in the first embodiment, 200-dpi image data (after image reduction) is stored in image memory 504, and encoded data, subject to hierarchical encoding based on 400-dpi and 200-dpi image data supplied from image reduction unit 510, is generated by arithmetic encoder 511 and is stored in code buffer memory 512.

Figure 7:
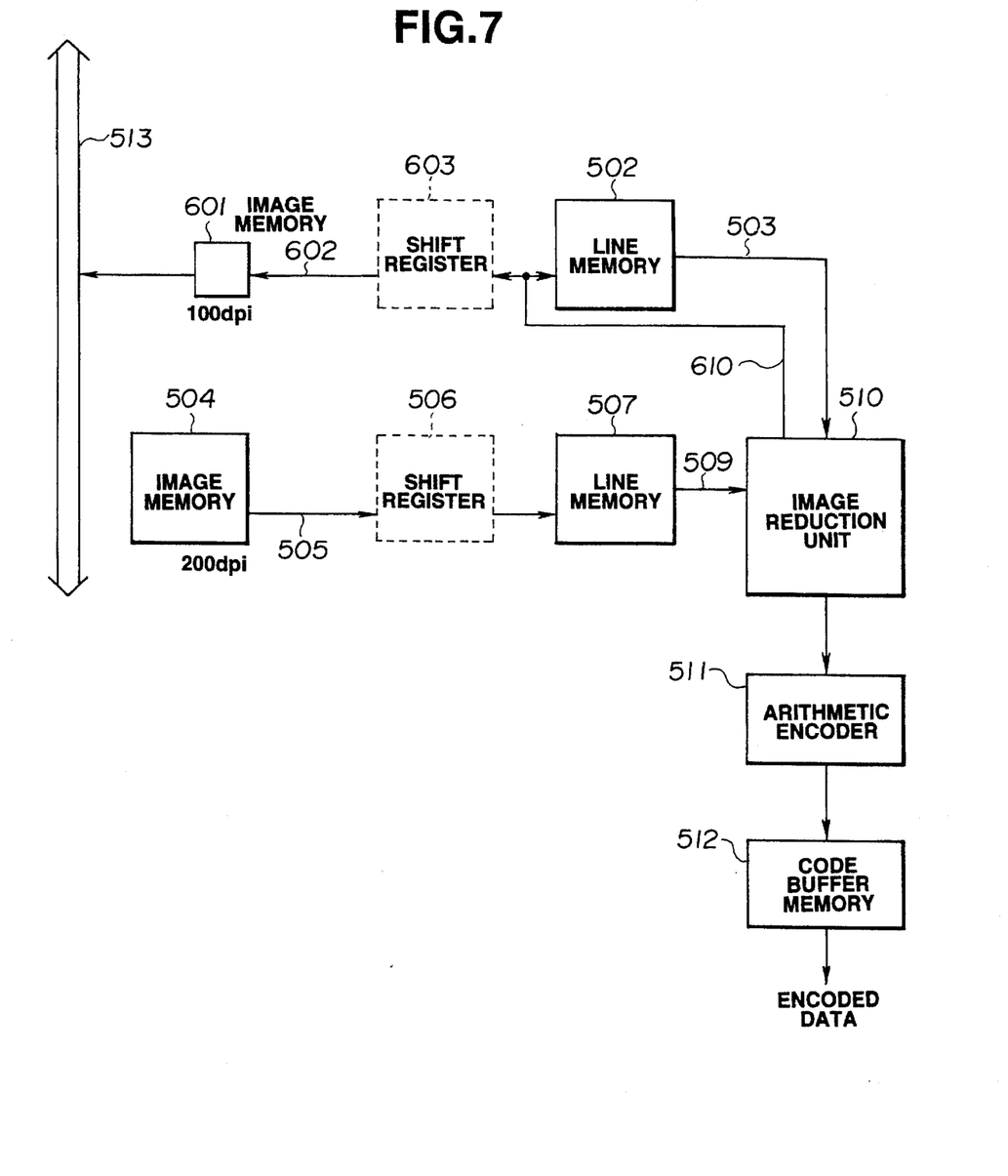
FIG. 7 is a diagram illustrating the flow of signals when a 200-dpi image is converted into a 100-dpi image in the second embodiment.

As shown in FIG. 7, when generating 100-dpi image data from the 200-dpi image data stored in image memory 504, image memory 601, having a size for a 100-dpi image, and shift register 603, for serial/parallel conversion, is provided. In this case, 100-dpi image data 610, reduced by image reduction unit 510, is stored in image memory 601 as parallel image data 602 via shift register 603.

Figure 8:
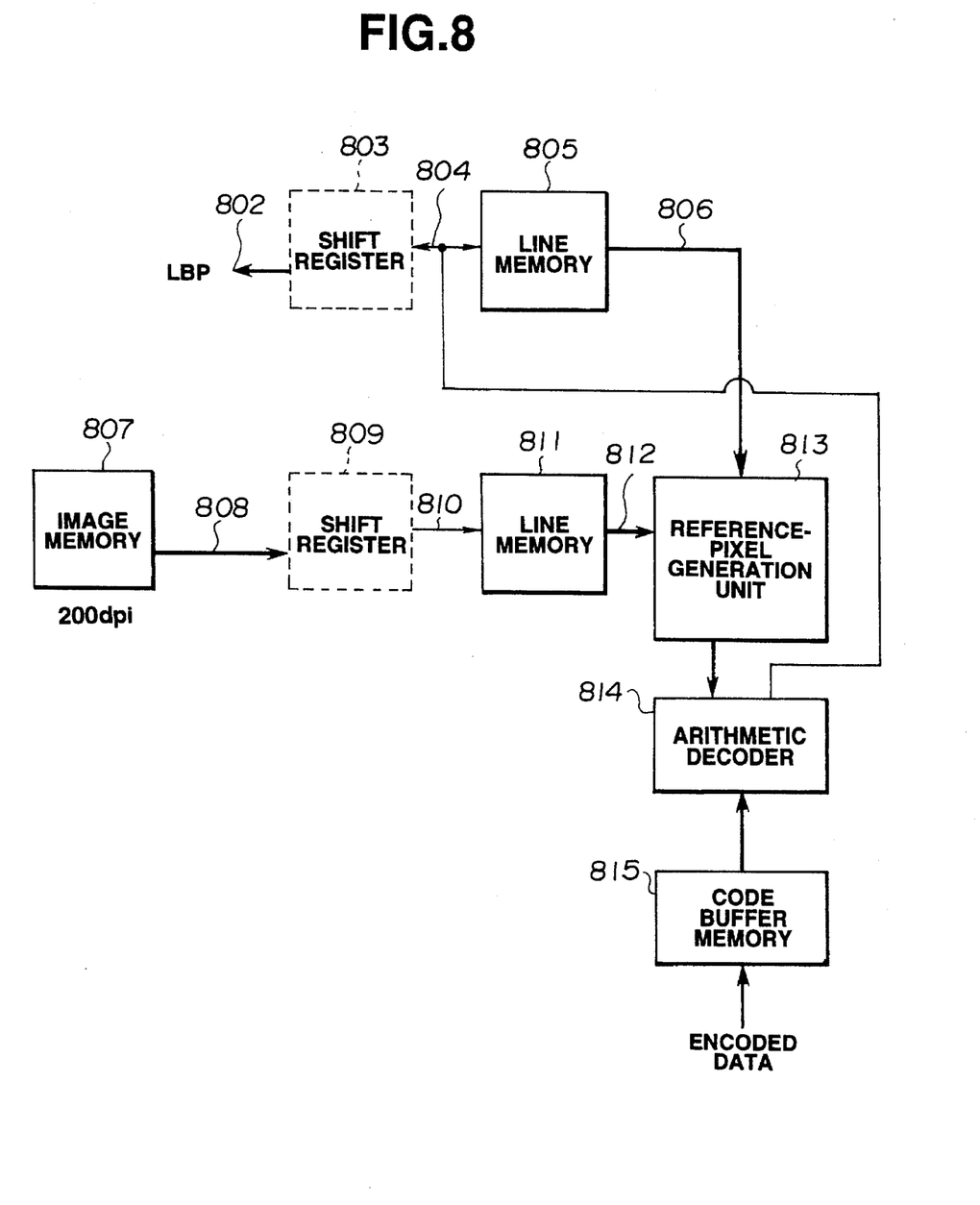
FIG. 8 is a diagram illustrating the flow of signals when encoded data is decoded and recorded using an LBP (laser-beam printer)

FIG. 8 illustrates the flow of signals when the above-described encoded data, representing the, 400-dpi image subjected to arithmetic encoding, is decoded, and image data obtained by the decoding operation is supplied to the LBP to record the 400-dpi image.

In FIG. 8, there are shown shift registers 803 and 809, line memories 805 and 811, image memory 807 for 200-dpi reduced image data, reference pixel generation unit 813, arithmetic decoder 814 and code buffer memory 815.

In the second embodiment, it is assumed that 200-dpi image data has already been decoded and stored in image memory 807. FIG. 8 illustrates the operation when encoded data from code buffer memory 815 is decoded, and a (400-dpi) image corresponding to the original image is recorded by the LBP.

When outputting the 400-dpi image to the LBP, the 200-dpi image data stored in image memory 807, and the 400-dpi image data after decoding stored in line memory 805, are supplied to reference pixel generation unit 813. Arithmetic encoder 814 decodes the encoded data based on reference-pixel data from reference-pixel generation unit 813, and the serial data output of arithmetic encoder 814 is directly output to the LBP. Accordingly, it is unnecessary to store the 400-dpi image data after decoding. Hence, image data of the original-image level can be input and output without providing a 400-dpi image memory (requiring a capacity of about 2 Mb for the A4 size) which greatly influences the cost.

As described above, according to the present invention, it is possible to reduce the cost of image memories necessary for hierarchical encoding and decoding of image data.

The individual components shown in outline or designated by blocks in the drawings are all well-known in the image processing apparatus art and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:

first storage means for storing first image data;

second storage means for storing image data which is different from the image data stored in said first storage means;

conversion means for converting a resolution of the image data read from said first storage means and said second storage means to reduce the resolution of the read image data; and encoding means for encoding the image data read from said first storage means and said second storage means, wherein, while the first image data having a first resolution read from said first storage means is being converted by said conversion means into a second image data having a second resolution, the first image data having the first resolution is encoded by said encoding means with reference to the second image data having the second resolution from said conversion means, and the second image data having the second resolution is stored in said second storage means, and wherein, while the second image data having the second resolution read from said second storage means is being converted by said conversion means into a third image data having a third resolution, the second image data having the second resolution is encoded by said encoding means with reference to the third image data having the third resolution from said conversion means, and the third image data having the third resolution is stored in said first storage means in which the image data having the first resolution has previously been stored.

2. An image processing apparatus according to claim 1, wherein said encoding means encodes the first image data and the second image data by means of a prediction using the first image data and the second image data before resolution conversion and the first image data and the second image data subjected to resolution conversion by said conversion means.

3. An image processing apparatus according to claim 1, wherein the image data having the third resolution read from said first storage means is encoded by said encoding means.

4. An image processing apparatus according to claim 3, wherein the image data having the third resolution read from said first storage means is converted into image data having a fourth resolution by said conversion means, and the image data having the fourth resolution is stored in said second storage means in which the image data having the second resolution has been stored.

5. An image processing method, comprising the steps of:

converting a first image data having a first resolution read from a first storage means into a second image data having a second resolution which is lower than the first resolution;

encoding the first image data having the first resolution with reference to the second image data having the second resolution while converting the first image data having the first resolution into the second image data having the second resolution;

storing the second image data having the second resolution into a second storage means which is different from the first storage means;

converting the second image data having the second resolution read from the second storage means into a third image data having a third resolution which is lower than the second resolution;

encoding the second image data having the second resolution with reference to the third image data having the third resolution while converting the second image data having the second resolution into the third image data having the third resolution; and storing the third image data having the third resolution in the first storage means in which the image data having the first resolution had previously been stored.

6. An image processing method according to claim 5, wherein each of said encoding steps encodes the first image data and the second image data by means of a prediction using the first image data and the second image data before resolution conversion and the first image data and the second image data subjected to resolution conversion in each of said converting steps.

7. An image processing method according to claim 5, further comprising the step of encoding the image data having the third resolution read from the first storage means.

8. An image processing method according to claim 7, further comprising the step of converting the image data having the third resolution read from the first storage means into image data having a fourth resolution.

9. An image processing method according to claim 8, further comprising the step of storing the image data having the fourth resolution in the second storage means in which the image data having the second resolution has been stored.

10. An image processing apparatus comprising:

a first storage means for storing a first image data having a first resolution;

a conversion means for converting a resolution of image data, with said conversion means converting the first image data as read out from said first storage means into a second image data having a second resolution which is lower than the first resolution;

encoding means for encoding image data, with said encoding means encoding the first image data with respect to the second image data for providing a first encoding data concurrent with the first image data being converted into the second image data;

a second storage means which is different from said first storage means for storing the second image data;

said conversion means converting the second image data as read out from said second storage means into a third image data having a third resolution which is lower than the second resolution;

said encoding means encoding the second image data with respect to the third image data for providing a second encoded data concurrent with the second image data being converted into the third image data; and means for storing the third image data in a location of said first storage means where the first image data was previously read out.

11. An image processing method, comprising the steps of:

converting a first image data, having a first resolution, read from a first storage means into a second image data having a second resolution which is lower than the first resolution;

encoding the first image data with respect to the second image data for providing a first encoded data concurrent with the first image data being converted into the second image data;

storing the second image data in a second storage means which is different from the first storage means;

converting the second image data read from the second storage means into a third image data having a third resolution which is lower than the second resolution;

encoding the second image data with reference to the third image data for providing a second encoded data concurrent with the second image data being converted into the third image data; and storing the third image data in the first storage means in place of the first image data which had previously been read out.

* * * * *

UNITED STATES PATENT AND TRADEMARK OFFICE
CERTIFICATE OF CORRECTION

PATENT NO. : 5,579,412

DATED : November 26, 1996

INVENTOR(S) : TSUTOMU ANDO

Page 1 of 2

It is certified that error appears in the above-identified patent and that said Letters Patent is hereby corrected as shown below:

COLUMN 2

Line 29, "it" should read --It--.

COLUMN 3

Line 57, "10 The" should read --¶ The--.

COLUMN 4

Line 6, "FIG. 3" should read --¶ FIG. 3--.
Line 13, "Referring" should read --¶ Referring--.
Line 20, "encoder" should read --encoder 114--.
Line 40, "10" should be deleted.
Line 52, "memory 11" should read --memory 111--.

COLUMN 5

Line 23, "10" should be deleted.

UNITED STATES PATENT AND TRADEMARK OFFICE
CERTIFICATE OF CORRECTION

PATENT NO. : 5,579,412

DATED : November 26, 1996

INVENTOR(S) : TSUTOMU ANDO

It is certified that error appears in the above-identified patent and that said Letters Patent is hereby corrected as shown below:

<u>COLUMN 6</u>

```
Line 17, "the," should read --the--.
```

Signed and Sealed this

Third Day of June, 1997

*Attest:*

BRUCE LEHMAN

*Attesting Officer*     *Commissioner of Patents and Trademarks*